United States Patent [19]

Kazlauskas

[11] Patent Number: 4,649,250

[45] Date of Patent: Mar. 10, 1987

[54] PIPE WELDER

[76] Inventor: Gasparas Kazlauskas, 10219 Briarwood Dr., Los Angeles, Calif. 90024

[21] Appl. No.: 742,897

[22] Filed: Jun. 10, 1985

[51] Int. Cl.[4] .......................... B23K 37/02; B23K 9/12
[52] U.S. Cl. ................................ 219/60 A; 219/60 R; 219/125.11
[58] Field of Search .................. 219/59.1, 60 A, 60 R, 219/125.1, 125.11

[56] References Cited

U.S. PATENT DOCUMENTS

| | | | |
|---|---|---|---|
| 3,727,025 | 4/1975 | Dibenedetto | 219/60 A X |
| 3,753,525 | 8/1973 | Homes | 219/60 A X |
| 4,260,869 | 4/1981 | Slavens et al. | 219/60 A X |
| 4,373,125 | 2/1983 | Kazlauskas | 219/60 A |

FOREIGN PATENT DOCUMENTS

284225  4/1971  U.S.S.R. ........................... 219/60 A

Primary Examiner—E. A. Goldberg
Assistant Examiner—Catherine M. Sigda
Attorney, Agent, or Firm—Jack C. Munro

[57] ABSTRACT

A pipe welder for the automatic welding of joints between end abutting stationary sections of pipe which uses a welding head assembly mounted on a track which is mounted about the pipe. The welding head is low frictionally supported by a roller assembly connected between edges of the track. The track includes gear engaging slots. A drive gear is to engage with the gear engaging slots. The drive gear is flexibly mounted on the welding head housing so as to be continuously biased into positive engagement with the gear engaging slots.

5 Claims, 12 Drawing Figures

PIPE WELDER

BACKGROUND OF THE INVENTION

The field of this invention relates to the welding of separate metallic cylindrical tubular elements. More particularly, this invention relates to a pipe welder to automatically efficiently produce an extremely strong weld between piping sections.

It has long been known that in the welding of any two parts together, a desirable type of weld is a weld bead which is slightly raised on both the interior and exterior surface of the parts. Satisfactory penetration of the heat energy must occur to melt the edges of the to be welded parts and then with the addition of a filler wire completely fill the welding groove with an intermolecular bond occurring between the melted filler wire and the metallic material of the parts.

The producing of a satisfactory weld requires a perfect or complete welding to occur along the entire length of the weld bead. If the two parts to be welded comprise a one foot diameter pipe, the actual weld bead in welding together the two pipes will be over three feet in length. A flaw of a fraction of an inch within that three feet of length will result in the producing of an unsatisfactory weld.

It has been common in the past to mount some form of track assembly on the pipe upon which is mounted a welding head assembly. The welding head assembly is movable around the track to automatically produce the weld which in turn will weld two sections of the pipe together. Because the production of an extremely high quality weld is required, any momentary pause or speeding up of the welding head will be sufficient to effect the quality of the weld. A pause can be created if only for a split second the driving mechanism, which moves the welding head, is disengaged from the track on which it is mounted. Therefore, it is exceedingly important that the driving mechanism be continuously and positively engaged with the track at all times it is operated to move the welding head on the track about the pipe.

Additionally, the mounting of a welding head onto a track is usually accomplished by means of some kind of a roller assembly in conjunction with a belt mounted about the pipe or a roller assembly in conjunction with a chain. Although such mountings of the welding head have been proved to be satisfactory in the past, there is a stringent requirement to produce such rollers, belts and chains with a high degree of tolerance so as to eliminate any pausing or speeding up of the welding head. However, with such types of welding head mounting devices, speeding up or pausing of the welding head does occur.

There is a need to positively mount the welding head onto the track so as to facilitate low frictional movement of the welding head about the track but also insure that the welding head will not vary even slightly in spacing from the surface of the pipe which is to be welded. Such variation in spacing will inherently cause the welding electrode to also vary which in turn will result in the production of a diminished quality weld. Therefore, it is exceedingly important that the welding head be attached to the track in such a manner as to not be movable radially outward therefrom as the welding head is moved around the track.

Additionally, it is important to have a welding head be as versatile as possible. At times it may be desirable to use only a single filler wire assembly, where at other times it may be more desirable to use a dual filler wire assembly. In the past, it has been common to construct welding apparatuses to utilize only a single filler wire assembly. It would be desirable to construct a welding head in which it would also be possible to use two in number of filler wire assemblies if such is found to be desirable for a particular welding situation.

SUMMARY OF THE INVENTION

The pipe welder of this invention includes a welding electrode which is mounted onto a welding electrode housing. The welding electrode housing has mounted thereon a drive gear. The drive gear is mounted to the welding electrode housing by means of a flex joint. A manually operated cam is to be movable to move the flex joint and its connected drive gear between a retracted position and an operating position. With the drive gear in the operating position, it is to engage with a series of gear engaging slots formed within a flexible but rigid thin band. The band forms a continuous structure about the pipe to be welded. There is also utilized a manually operated clamping assembly for mounting the welding head assembly onto the track. The manually operated clamping assembly includes a low frictional roller assembly to permit ease of movement of the welding head assembly about the track. The low frictional roller assembly is to engage with the side edges of the track. The welding head assembly can be utilized to include two separate filler wire assemblies as opposed to just one filler wire assembly.

DETAILED DESCRIPTION OF THE SHOWN EMBODIMENT

Referring particularly to the drawings, there is shown the pipe welder 20 of this invention which has a welding head housing 22. There is also a welding electrode housing 24 upon which is mounted a welding electrode 26. The welding electrode 26 is mounted within the confines of a gas cup 28. The gas cup 28 is connected by appropriate supporting mechanism to adjustably mount the welding electrode 26 and gas cup 28 onto support bracket 30. Support bracket 30 is mounted on arms 32 and 33. The arm 32 is pivotly mounted on a shaft 34 which is mounted on electrode housing 24. Arm 33 is pivotly mounted on a pivot pin 35 which is mounted on the electrode housing 24. Shaft 34 is pivotly driven by means of a motor 36. The motor 36 is mounted onto a portion of the welding electrode housing 24.

The operation of the motor 36 is to be in response to commands received from a command module (not shown). Operation of the motor 36 will result in movement of the welding electrode 26 radially with respect to pipe center 38. Movement of the electrode 26 radially is to be in response to feedback of the voltage occurring during welding. The motor 36 is generally termed an automatic voltage control motor. The function of the motor 36 as well as the basic construction of the welding electrode 26 and the support bracket 30 are deemed to be conventional and form no specific part of this invention.

The welding electrode housing 24 is slidably mounted onto the welding head housing 22 with the slidable movement being in a lineal direction along the longitudinal center axis of a lead screw 40. The lead screw 40 threadably engages with extension 42 which is integrally formed as part of the welding electrode housing 24. Fixedly secured to the extension 42 is a sleeve 44. Lead screw 40 also threadably engages internally with the sleeve 44.

It can thus be seen that by rotating of lead screw 40 the entire welding electrode housing 24 will move lineally in a direction represented by arrow 46 relative to the welding head housing 22.

Lead screw 40 is fixedly secured to a driven gear 48. The driven gear 48 engages with a driving gear 50. The driving gear 50 is connected to a shaft 52. The shaft 52 is connected to oscillator motor 54. Again, the motor 54 is operated from the command module in order to produce oscillation of the welding electrode housing 24 as well as the welding electrode 26 across the welding bead during the welding procedure. This type of oscillatory movement is again deemed to be conventional and forms no specific part of this invention. The motor 54 is mounted onto a mounting plate 55 which in turn is fixedly mounted onto the welding head housing 22.

It is common to use a filler wire during welding. The filler wire is to be conducted through hollow tube 56 to a position directly adjacent the tip of the welding electrode 26. The aft end of the tube 56 is pivotly mounted onto a bracket 58. The bracket 58 is mounted on a pin 60. The pin 60 is supported by an arm 62. The arm 62 is pivotly mounted onto mounting bracket 30. Also, the midsection of the tube 56 is connected to the arm 62.

Filler wire (not shown) is to be conducted into the tube 56 after the main portion of the wire has been wound onto spool 64. The spool 64 is pivotly mounted onto an arm 66. The arm 66 is in turn fixedly mounted onto a portion of the welding head housing 22.

Dispensing of the filler wire from the spool 64 is caused by motor 68. Again, operation of the motor 68 is from the control module. Motor 68 is mounted onto support bracket 70. Support bracket 70 is in turn fixedly mounted on a portion of the welding head housing 22.

Figure 1:
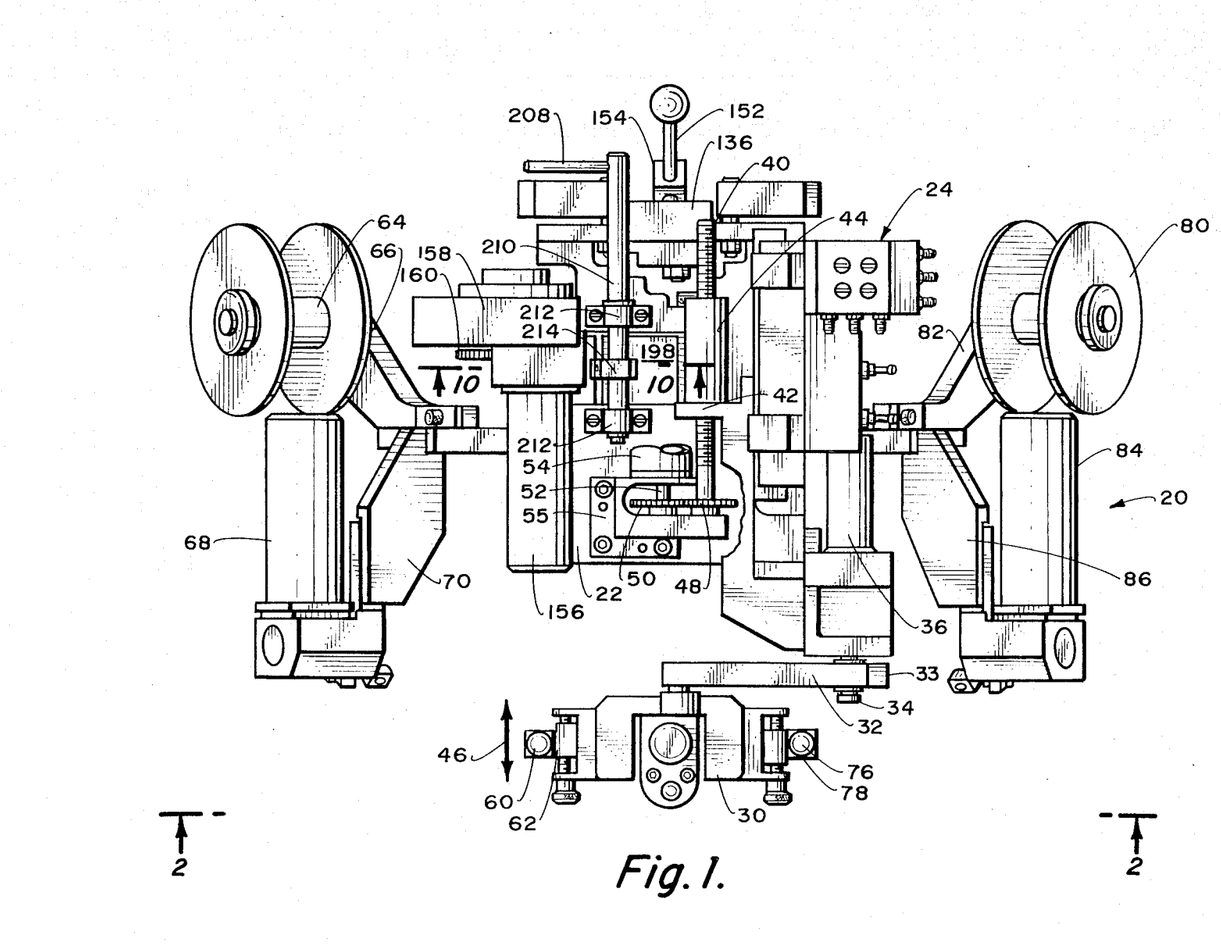
FIG. 1 is a top plan view, partially cut away, of the pipe welder of the present invention.
Figure 2:
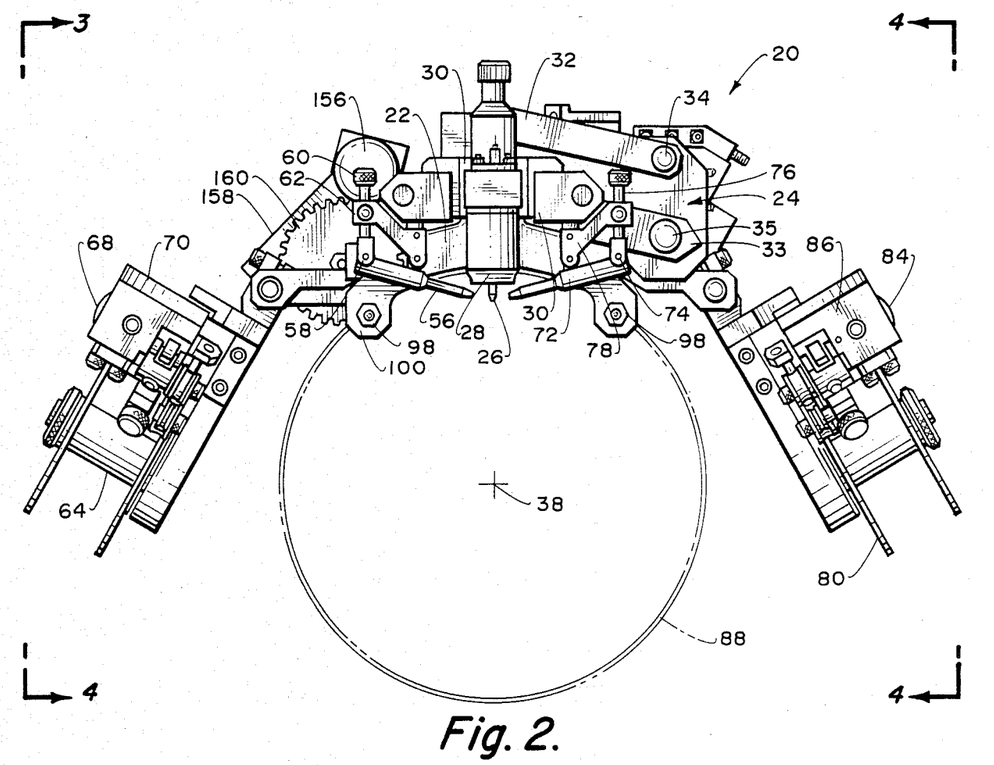
FIG. 2 is a front view of the pipe welder of this invention taken along line 2—2 of FIG. 1 showing the pipe welder as it would be installed onto a track which in turn is to be mounted onto the piping to be welded.

An advantage of the pipe welder 20 of this invention is that there may be utilized a completely separate filler wire feeding assembly at a separate location over what was previously described. Referring particularly to FIG. 2 of the drawings there is shown located a tube 72 through which filler wire is to be supplied directly adjacent the tip of the welding electrode 26 but diametrically opposite the tube 56. The tube 72 is pivotly mounted onto bracket 74 with the bracket 74 being fixedly secured to a pin 76. The pin 76 is connected to an arm 78 which in turn is pivotly mounted onto support bracket 30. The filler wire is conducted to tube 72 from a spool 80. The spool 80 is pivotly mounted onto arm 82. Rotation of the spool 80 is caused through a motor 84 which is mounted on arm 86. Arm 86 as well as arm 82 are both fixedly mounted onto a portion of the welding head housing 22. The operation of the motor 84 is by means of the command module.

Basically, the filler wire assembly represented by numerals 56 through 70 is substantially identical to the filler wire assembly represented by numerals 72 through 86. The only difference between the filler wire assemblies, is that one is basically a mirror image of the other with one being a "right hand" filler wire assembly and the other being a "left hand" filler wire assembly.

A thin strip of material referred to as band 88 is to be exteriorly mounted on the pipe (not shown), which has a longitudinal center axis 38, at a desired longitudinal location. This band 88 will normally be constructed of a rigid material with usually stainless steel or other similary type of material being preferred. The band is to be flexible enough to be bendable around the pipe to occupy a rigid encompassing position thereon. With the band 88 so installed, the operator then needs to install the welding head housing 22 onto the band 88.

The band 88 has a pair of side edges 90 and 92. A pair of low frictional rollers 94 are to connect with the side edge 90 with there only being a single roller 94 being shown. Each roller 94 is mounted within a bifurcated bracket 96. Each of the brackets 96 are fixedly mounted onto a pin 98. Each of the pins 98 pass through an appropriate opening formed within a plate 100. The plate 100 is fixedly attached onto the portion of the welding head housing 22. As a result, each of the brackets 96 are to be freely pivotable relative to the welding head housing 22 about their respective pins 98. This provides for adjustment so that the rollers 94 can be canted at different angles in order to accommodate to different diameter of bands 88. It is to be understood that each of the rollers 94 includes an annular groove with which to engage the edge 90. It is to be noted that the rollers 94 are only pivotable relative to the welding head housing 22 and are not lineally movable in respect thereto.

Figures 3, 8:
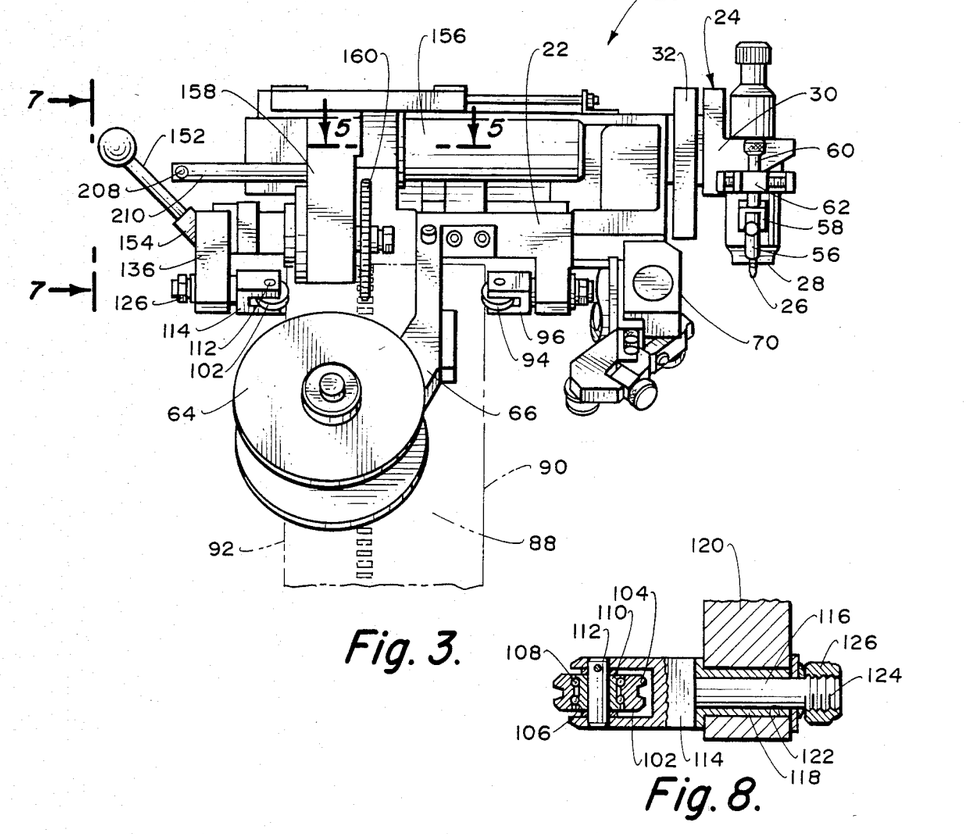
FIG. 3 is a left side elevational view of the pipe welder of the present invention taken along line 3—3 of FIG. 2.
FIG. 8 is a cross-sectional view taken along line 8—8 of FIG. 7 showing in more detail the low frictional roller arrangement utilized in conjunction with the mounting assembly incorporated within the pipe welder of the present invention.
Figure 4:
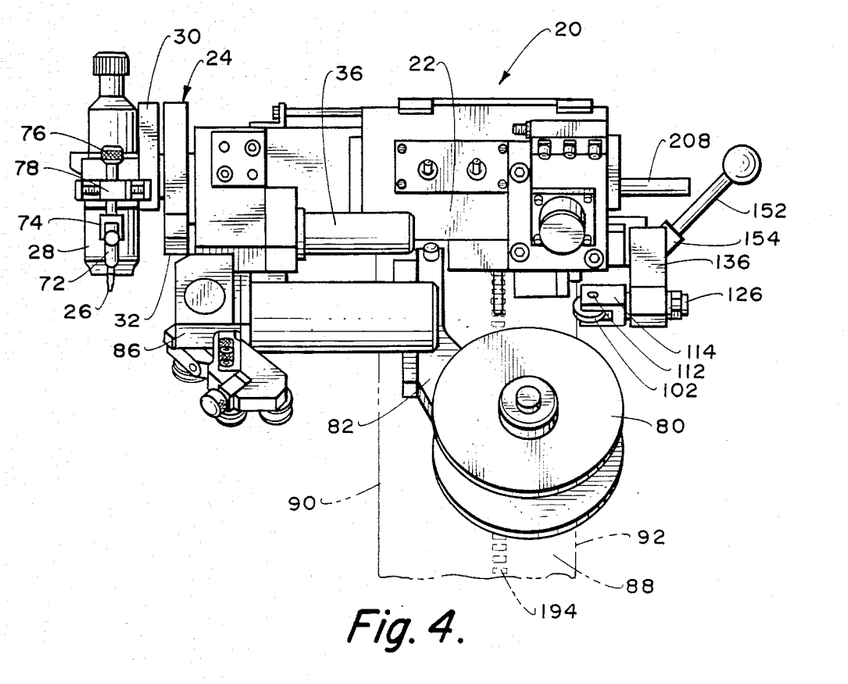
FIG. 4 is the right side elevational view of the pipe welder of the present invention taken along line 4—4 of FIG. 2.
Figure 5:
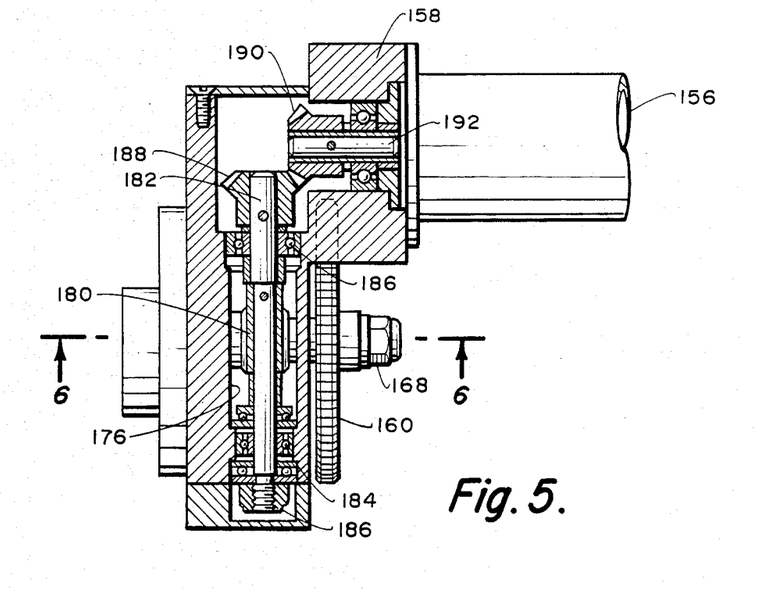
FIG. 5 is a cross-sectional view through a portion of the pipe weld of the present invention taken along line 5—5 of FIG. 3.
Figure 6:
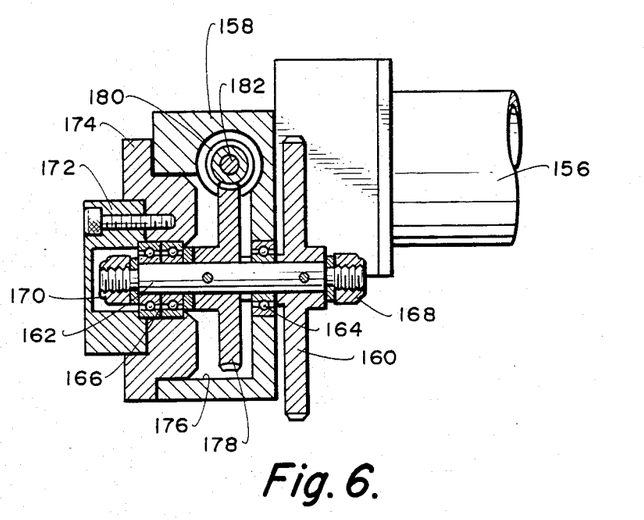
FIG. 6 is a cross-sectional view showing in more detail the drive gear arrangement utilized in conjunction with the pipe welder of the present invention taken along line 6—6 of FIG. 5.
Figure 7:
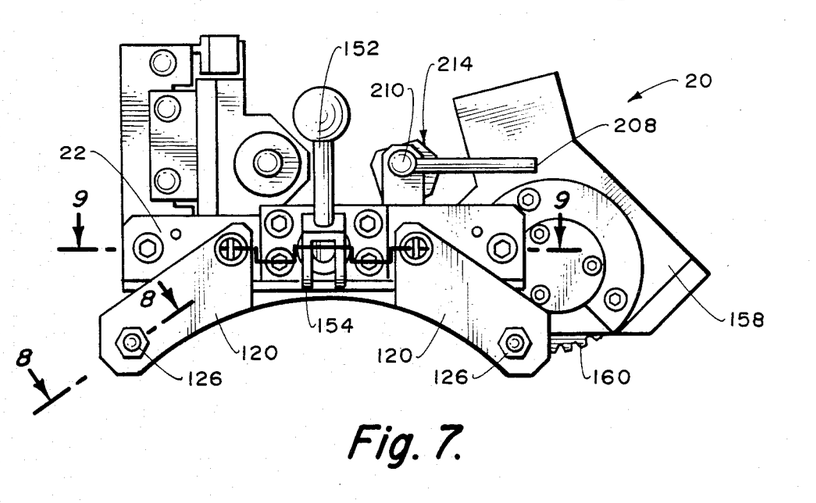
FIG. 7 is a back view of the pipe welder of the present invention taken along line 7—7 of FIG. 3.

To engage with the edge 92 are a pair of rollers 102 which are similar to rollers 94. For construction of the rollers 102 (and also rollers 94) reference is to be had to FIG. 8 wherein the roller 102 includes an annular groove 104 with which to engage the edge 92. The roller 102 includes a central hole 106 within which is located a bearing assembly 108. The bearing assembly 108 separates the roller 102 from center section 110 of the roller. The center section 110 is fixedly mounted onto a pin 112. The pin 112 is mounted within bracket 114 with the aft end of the bracket 114 being integrally connected to rod 116. Rod 116 passes through a sleeve 118 which low frictionally pivotly supports the rod 116 relative to plate 120. Sleeve 118 is in a close conforming manner within a hole 122 formed within the plate 120. The outer end of the rod 116 includes screw threads 124. A nut 126 is to engage with the threads 124 to secure in position the rod 116 onto the plate 120.

Again, it is to be understood that there will be similar parts for each of the pair of spaced apart rollers 102. There are actually two in number of plates 120 one for each roller 102. Each of the rollers 102 can be canted at various angles in a manner similar to the canting of the rollers 94.

Each of the plates 120 is mounted by means of a mounting pin onto separate supporting rods 128. Each of the supporting rods 128 are fixedly mounted by nuts 130 onto a plate 132. The plate 132 is fixedly mounted by bolts 134 to a cam housing 136.

Figure 9:
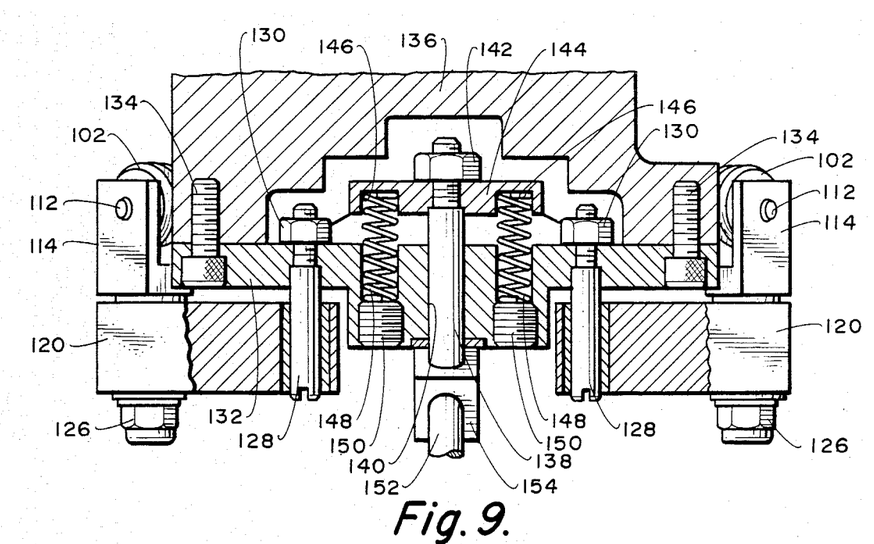
FIG. 9 is a cross-sectional view showing in more detail the mounting assembly for clamping the pipe welder of the present invention onto the track.

An inner portion 138 of a cam handle extends through a hole 140 formed within the plate 132. This inner portion 138 is fixedly secured by nut 142 to a plate 144. The plate 144 is fixed and part of welding head housing 22. Within the plate 144 are formed a pair of recesses 146. A coil spring 148 is to connect with each recess 146. The outer end of each of the coil springs 148 abuts against a socket head screw 150. The function of the springs 148 is to exert a continuous bias tending to locate the plate 144 spaced from plate 132 as shown in FIG. 9 of the drawings.

However, plate 132 can be moved to abut substantially against the plate 144 compressing each of the springs 148. This movement is to be created by means of outer portion of handle 152. The inner portion 138 is pivotly connected to bifurcated end 154 of the handle 152. Movement of the outer portion 152 in a pivoting position relative to the inner portion 138 can cause the bifurcated end 154 to cam or push against plate 132 moving such toward plate 144. This will result in the rollers 102 moving into engagement with the side edge 92. Once this engagement has incurred with the side edges 92, the handle 152 will assume a "over the center" position and will remain in that position when left unattended. At this particular time the welding head housing 22 is now mounted onto the band 88 but is capable of being freely (low frictionally) rotated about the band 88 and the pipe upon which the band 88 is mounted.

In order to move the welding head housing 22 about the band 88 at a precise continuous speed without any slight pauses or increases in speed, there is to be utilized the following drive mechanism: The driving motion is obtained through the use of a motor 156. The operation of the motor 156 is again controlled by the command module. The motor 156 is capable of being increased or decreased in speed. The motor 156 is mounted on a plate 158. Rotatably mounted on plate 158 is a drive gear 160. The drive gear 160 is rotatably mounted on plate 158 by shaft 162. The shaft 162 is supported by bearings 164 and 166 within the plate 158. Position of the gear 160 is fixed on the shaft 162 by means of nut 168. The outer end of the shaft 162 is fixed in position by means of nut 170. The nut 170 is encased by a cup 172 which is fixedly mounted onto cap 174 which is also fixedly mounted onto the plate 158.

Located within the plate 158 is an internal chamber 176. Fixedly secured to the shaft 162 and rotatably positioned within the internal chamber 176 is a gear 178. The gear 178 is in constant engagement with a worm gear 180. The worm gear 180 is mounted onto a shaft 182. The shaft 182 is low frictionally supported by appropriate bearings 184 and 186 within the plate 158. One end of the shaft 182 is connected to a nut 186 with the opposite end of the shaft 182 being fixedly secured onto a beveled gear 188. The beveled gear 188 engages with a second beveled gear 190. The second beveled gear 190 is fixedly mounted onto a shaft 192 which extends from the motor 156.

Thus it can be seen that operation of the motor 156 will result in rotation of the motor shaft 192, gears 190 and 188 which in turn will rotate shaft 182. Rotation of shaft 182 similarly rotates worm gear 180 which will then result in turning of the gear 178. Turning of gear 178 results in direct turning of drive gear 160. Since drive gear 160 is in continuous engagement with a series of closely spaced slots 194 formed within the band 88, the entire pipe welder 20 is moved about band 88.

To insure that there is no momentary slippage in the connection of the drive gear 160 relative to the band 88, the plate 158 is mounted so as to be continuously biased toward the band 88. This bias is provided by means of a thin rigid metallic strip 196 one end of which is fixedly mounted by pins 195 to the plate 158. The strip 196 is slightly flexible which creates this biasing action toward band 88. The opposite end of the plate 196 is fixedly mounted by pins 197 onto a plate 198. The free end of the plate 198 is connected by a pivot pin 200 to the welding head housing 22.

Figures 10, 11:
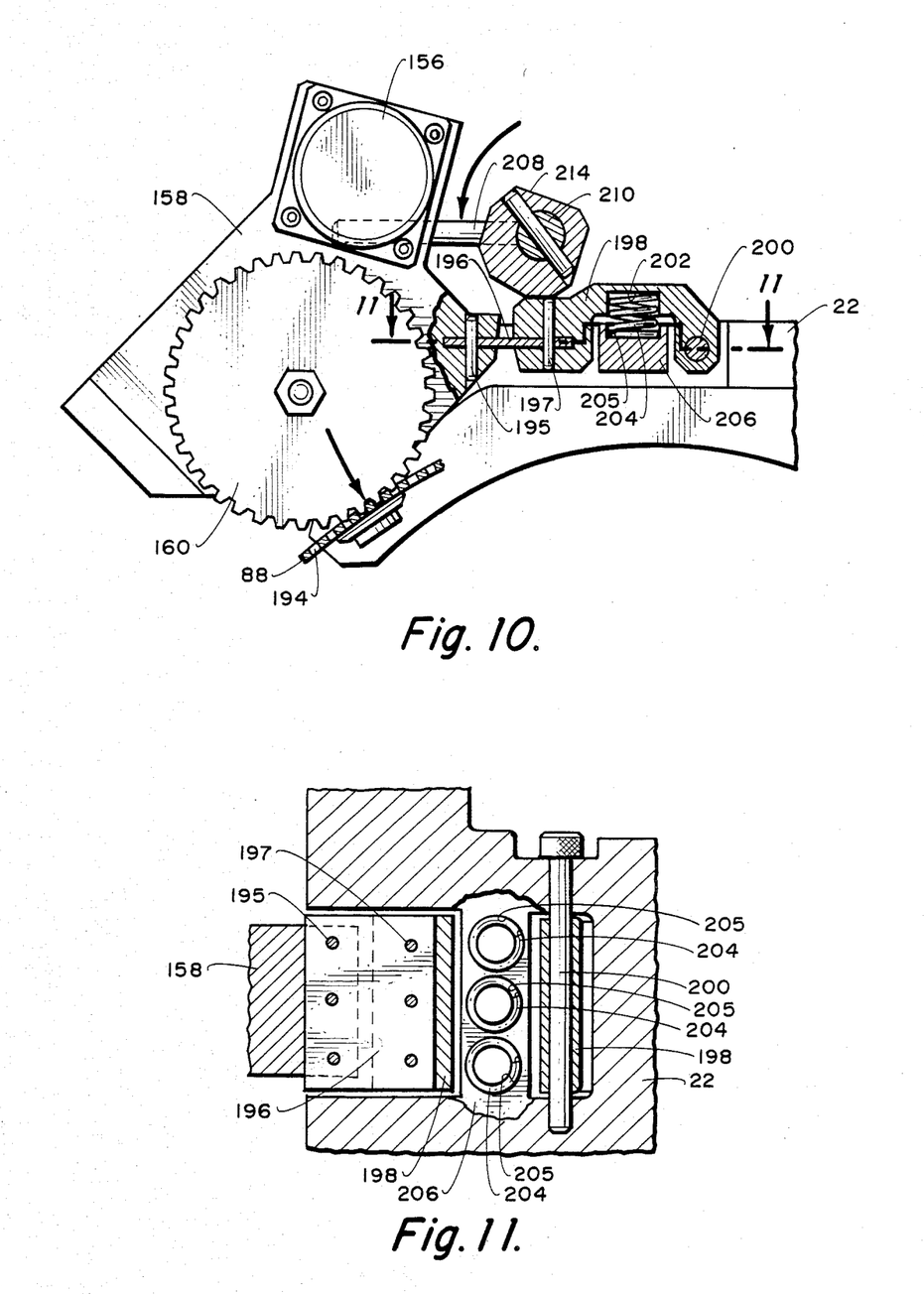
FIG. 10 is a view, partly in cross-section, showing in more detail the drive gear arrangement incorporated in the pipe welder of the present invention taken along line 10—10 of FIG. 1 showing the drive gear arrangement engaged with the band which is in the operating position.
FIG. 11 is a cross-sectional view through the flex joint assembly which is utilized in conjunction with the drive gear of the pipe welder of this invention taken along line 11—11 of FIG. 10.
Figure 12:
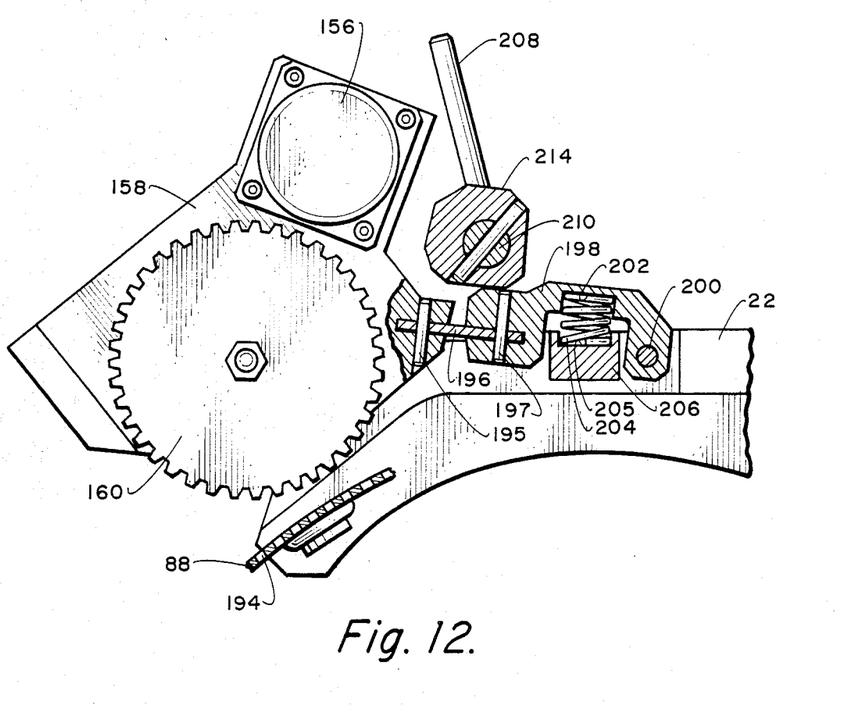
FIG. 12 is a cross-sectional view, similar to FIG. 10, but showing the drive gear arrangement spaced from the band which is the retracted position.

The plate 198 is capable of slight pivoting motion about the pivot pin 200 from the operative position shown in FIG. 10 of the drawings, to a retracted position shown in FIG. 12 in which the drive gear 160 will be spaced slightly from the band 88 and, therefore, the teeth of the gear 160 will not engage with the slots 194. Internally of the plate 198 there is a recess 202 within which is located a coil spring 204. The inner end of the coil spring 204, is located within recess 205 of cup 206 which is fixedly mounted onto a portion of the welding head housing 22. There are three in number of springs 204. The function of the springs 204 is to exert a continuous bias tending to locate the drive gear 160 in the retracted positon.

The plate 198, the springs 204, the strip 196, the plate 158 and motor 156 form part of what can be termed a flex joint assembly. In referring to this structure as a flex joint assembly the plate 198 can be referred to as a flex joint housing.

Therefore, in order to move the drive gear 160 to the operative position, there is employed a handle 208 which is manually pivoted about rod 210 within spaced apart brackets 212 which are fixedly mounted onto the welding head housing 22. Centrally mounted between the brackets 212 is an irregularly shaped cam member 214. Pivoting of the handle 208 approximately ninety degrees will result in the irregularly shaped cam member 214 to exert pressure against the upper surface of the plate 198 pushing such to its lowermost position which will result in the drive wheel 160 being moved to the operative position. It is to be kept in mind that in the operative position the only support between the plate 158 and the plate 198 is through strip 196.

What is claimed is:

1. A pipe welder comprising:

track means adapted to be fixedly mounted onto a pipe, said track means extending entirely around the circumference of the pipe, said track means including gear engaging means, said track means defining a pair of side edges;

a welding head assembly mounted by mounting means on said track means, said welding head assembly including drive means, said drive means to be in continuous engagement with said gear engaging means, said drive means being attached to said welding head assembly by a flex joint assembly, said flex joint assembly permitting limited movement of the drive means relative to said welding head assembly in a direction toward and away from said track means between a retracted position and an operating position, said retracted position being when said drive means is spaced from said track means, said operating position being when said drive means connects with said gear engaging means, with said drive means in said operating position said flex joint assembly causing the applying of a resilient force pressing said drive means into continuous engagement with said gear engaging means;

motor means for rotating said drive means to move said welding head assembly along said track means;

said drive means including a drive gear, said drive gear being mounted on and solely supported by a thin strip of rigid material, said motor means being mounted on said drive means, said thin strip of rigid material being slightly flexible exerting a continuous bias tending to maintain said drive gear in continuous contact with said track means when said drive means is in said operating position; and said thin strip of material being attached to a flex joint housing, said welding head assembly including a welding head housing, said flex joint housing being pivotly mounted to said welding head housing, a spring assembly mounted between said welding head housing and said flex joint housing, said spring assembly exerting a continuous force tending to locate said flex joint housing in said retracted position.

2. The pipe welder as defined in claim 1 wherein said mounting means comprises:

a low frictional roller assembly to connect with said side edges, said low frictional roller assembly being movable from an engaging position to a disengaging position, said disengaging position permitting installation of said welding head assembly onto said track means, with said low frictional roller assembly in said engaging position said welding head assembly being low frictionally movable on said track means.

3. The pipe welder as defined in claim 1 wherein:

said gear engaging means comprising a series of slots formed within said track means, said drive means including a drive gear, said drive gear to engage with said slots.

4. The pipe welder as defined in claim 1 wherein:

manually operated cam means connected to said flex joint housing, said manually operated cam means to be manually operated to move said flex joint housing against the action of said spring means from said retracted position to said operating position.

5. The pipe welder as defined in claim 1 wherein:

said welding head assembly being mounted on a welding head housing, a wire feed assembly being mounted on said welding head housing, said wire feed assembly being composed of two separate wire feed units with each said unit being capable of individually supplying wire to the welding area.

* * * * *